US010189136B2

United States Patent
Coleman

(10) Patent No.: US 10,189,136 B2
(45) Date of Patent: Jan. 29, 2019

(54) POWER TOOL WITH DIGITAL VARIABLE RELUCTANCE MOTOR CONTROL

(71) Applicant: JPW Industries Inc., LaVergne, TN (US)

(72) Inventor: Micah A. Coleman, Nashville, TN (US)

(73) Assignee: JPW Industries Inc., LaVergne, TN (US)

( * ) Notice: Subject to any disclaimer, the term of this patent is extended or adjusted under 35 U.S.C. 154(b) by 0 days.

(21) Appl. No.: 15/251,051

(22) Filed: Aug. 30, 2016

(65) Prior Publication Data

US 2017/0057038 A1 Mar. 2, 2017

Related U.S. Application Data

(60) Provisional application No. 62/212,912, filed on Sep. 1, 2015.

(51) Int. Cl.
*B23Q 17/09* (2006.01)
*B23Q 11/00* (2006.01)
*B23Q 15/08* (2006.01)

(52) U.S. Cl.
CPC ...... *B23Q 17/0957* (2013.01); *B23Q 11/0085* (2013.01); *B23Q 11/0092* (2013.01); *B23Q 17/098* (2013.01); *B23Q 17/099* (2013.01); *B23Q 17/0952* (2013.01); *B23Q 17/0961* (2013.01); *B23Q 17/0985* (2013.01); *B23Q 15/08* (2013.01); *Y10T 408/165* (2015.01); *Y10T 408/172* (2015.01); *Y10T 408/173* (2015.01)

(58) Field of Classification Search
CPC ........ B27G 19/06; B27G 19/02; B27G 19/04; Y10T 408/16; Y10T 408/165; Y10T 408/172; Y10T 408/173; Y10T 408/13; Y10T 408/14; B23Q 15/08; B23Q 17/0961; B23Q 17/0985; B23Q 17/10; B23Q 11/0082; B23Q 11/0092
USPC ..................................................... 83/74, 62.1
See application file for complete search history.

(56) References Cited

U.S. PATENT DOCUMENTS 2,661,780 A 12/1953 Morgan
2,864,270 A * 12/1958 Mitchell ................. B23B 41/02
279/66

(Continued)

FOREIGN PATENT DOCUMENTS

EP 0659525 A2 6/1995

OTHER PUBLICATIONS

International Preliminary Report on Patentability; Written Opinion of the International Searching Authority, dated Mar. 6, 2018, 13 pages.

*Primary Examiner* — Daniel Howell
(74) *Attorney, Agent, or Firm* — Waller Lansden Dortch & Davis, LLP; Blake M. Bernard

(57) ABSTRACT

A power tool includes a control for the motor of the power tool that senses an operating characteristic of the motor and controls the operation of the power tool based on the sensed characteristic. The sensed characteristic includes variations in reluctance of the motor. A controller may sense changes on load on the motor as a result of interaction between a working element such as a saw blade or drill bit and the work piece. The controlled operation may include variation in speed or torque or both, or may include stopping the motor. Emergency conditions may be sensed by changes in reluctance.

25 Claims, 5 Drawing Sheets

(56) References Cited

U.S. PATENT DOCUMENTS

| | | | |
|---|---|---|---|
| 3,095,979 A | | 7/1963 | Silberger |
| 3,545,310 A | * | 12/1970 | Greenberg ............. B23Q 11/04 |
| | | | 318/39 |
| 4,310,269 A | | 1/1982 | Neu et al. |
| 4,338,556 A | * | 7/1982 | Hetzel ...................... B23G 1/18 |
| | | | 318/283 |
| 4,559,577 A | * | 12/1985 | Shoji .................... B25H 1/0071 |
| | | | 318/434 |
| 4,604,006 A | * | 8/1986 | Shoji ...................... B23Q 11/04 |
| | | | 408/11 |
| 4,831,364 A | * | 5/1989 | Shinohara .......... G05B 19/4063 |
| | | | 340/664 |
| 5,009,554 A | * | 4/1991 | Kameyama .......... B23Q 1/4828 |
| | | | 408/129 |
| 5,035,547 A | * | 7/1991 | Shoji .................... B25H 1/0071 |
| | | | 408/11 |
| 5,558,476 A | | 9/1996 | Uchida et al. |
| 2001/0028236 A1 | | 10/2001 | Cheong |
| 2003/0234389 A1 | | 12/2003 | Davis et al. |
| 2004/0119431 A1 | | 6/2004 | Kawano et al. |
| 2008/0047974 A1 | | 2/2008 | Glasgow et al. |
| 2008/0074865 A1 | | 3/2008 | Lutz et al. |
| 2014/0231116 A1 | | 8/2014 | Pollock et al. |
| 2014/0352995 A1 | | 12/2014 | Matsunaga et al. |

* cited by examiner

POWER TOOL WITH DIGITAL VARIABLE RELUCTANCE MOTOR CONTROL

CROSS REFERENCE TO RELATED APPLICATION

The present application claims the benefit of U.S. Provisional Patent Application Ser. No. 62/212,912, filed on Sep. 1, 2015, which application is incorporated herein by reference.

BACKGROUND OF THE INVENTION

Field of the Invention

The present invention relates generally to power tool, and in particular to a motor control for a power tool and a power tool controlled by the motor control.

Description of the Related Art

Power tools are commonly used in a wide variety of fields. Control of the motor or other power source of the power tool can be by manual control or automatic control.

SUMMARY OF THE INVENTION

The present invention provides a power tool having a controller that senses an operating characteristic of the motor in the power tool to control one or more aspects of the power tool operation. A control circuit, such as a digital circuit using a microcomputer controller, senses variations in current through the motor as a result of changes in reluctance of the motor. The control circuit is connected to the motor and/or to the power tool. Upon sensing predetermined variations in reluctance or current the control circuit controls the power tool. In certain examples, the motor control provides a predetermined sequence of speed settings or speed profile which is controlled depending on the reluctance variations.

DETAILED DESCRIPTION OF THE PREFERRED EMBODIMENTS

Figure 1:
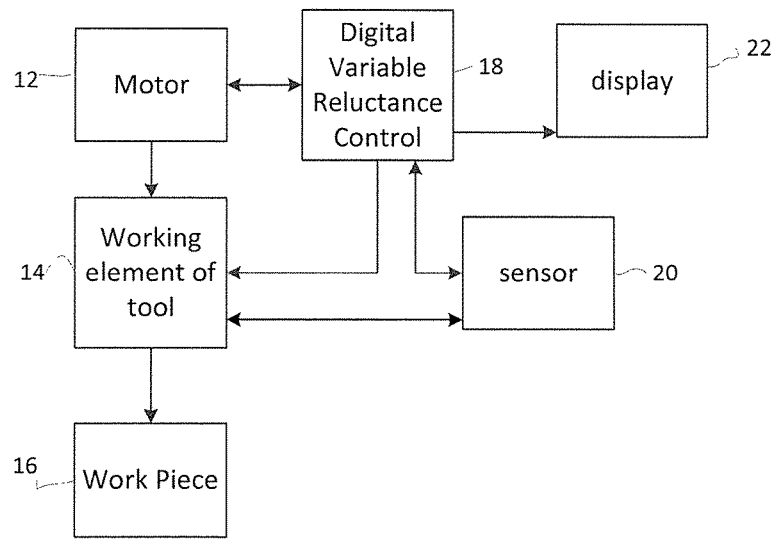
FIG. 1 is a schematic diagram of a power tool using the controller according to the principles of the present invention.

In FIG. 1, a power tool 10 includes a motor 12 that has a power output such as a motor shaft connected to a working element 14 of the power tool. Operation of the motor 12 drives the working element 14. The working element 14 interacts with a work piece 16, such as by cutting, drilling, abrading, or performing other work. As the motor 12 drives the working element, variations in operating characteristics of the motor occur. A control circuit 18 senses the variations and operates to control an operating condition of the motor. The control circuit 18 includes a microcomputer or processor in a digital circuit for control of the motor 12 and/or the power tool 14. The control circuit is referred to as a digital variable reluctance (DVR) controller.

An example according to certain embodiments provides that the control circuit 18 is connected to sense the current that is supplied to the coils of the motor 12. As the working element 14 is working the work piece 16, variations in load on the motor 12 occur. The variations in load change the torque on the motor 12. When a predetermined load condition occurs as sensed by the control circuit 18, the control circuit 18 transmits a command to the motor 12 to shut down. In certain embodiments, the shut-down command may result in the motor 12 being halted quickly. In one example, the motor may halt in 1/64 of a revolution. Other shut down characteristics are also possible.

The control circuit 18 senses where the motor is in the rotating cycle. Changes in load, such as an increase in load or a decrease in load, according to predetermined characteristics are used to control the tool operation.

The control circuit may sense a temperature, such as a temperature of the working element of the tool. The control circuit may sense acceleration for example using an accelerometer on the tool. The control circuit may use wireless communications, such as WiFi wireless communications, to obtain sensor data from the sensor and/or provide control commands to the motor or other power tool system.

The motor 12 is connected directly to the working element 14 of the tool. A direct drive connection is provided, and a transmission is avoided, by use of the control circuit to control speed and torque of the motor. A reduction in parts is possible, with greater efficiency and less maintenance.

In certain embodiments, the controller 18 is provided on a drill press power tool. Prior drill presses utilize a belt and pulley system between the motor and working element to drive the working element. A user changes the position of the belt on the pulleys to vary the speed and torque of the working element of the drill press. According to certain embodiments of the present invention, the belt and pulley transmission is eliminated and the controller 18 determines speed and torque of the drill press. The speed is controlled without the requirement for a mechanical speed variation. The working element 12 of the drill press is directly driven by the motor 12.

In a drill press, the controller 18 senses the load, for example, as a drill bit in a chuck of the drill press is in the process of drilling into the work piece 16. When an increase in load is sensed, indicating that the drill is bogged down, the controller 18 increases the torque provided by the motor 12. Similar operating control may be provided for other tools. The controller 18 automatically compensates for variations in operating speed of the tool.

The controller may sense a sudden change in speed by the working element. For example, if the work piece 16 starts to spin as a result of suddenly being released from a holder, the controller 18 may control the motor 12 and/or power tool 10 to stop.

The controller 18 may sense a gradual release of the working element 14 from the work piece 16, such as may occur when the working element is reaching an edge or outside surface of the work piece 16, the controller 18 may command the motor 12 to speed up. By speeding up as the drill or other working element reaches the other side of the work piece or the edge of the work piece 16, reducing splintering of the work piece. Punch through splintering may be prevented.

The controller 18 may sense a change in load characteristic of the hole being drilled through the work piece by the drill press. The controller may automatically stop the motor 12 or may automatically reverse the motor 12. The reversal of the motor 12 may facilitate easy removal of the working element from the work piece 16.

The controller 18 may control the working element to operate in alternate forward and reverse directions. For example, the drill press may be operated to perform one forward rotation of the working element 14, followed by a reverse operation, for example for one quarter of a rotation. Other values of forward and reverse rotation may be provided. The forward/reverse operation may facilitate drilling in metal or other materials by clearing the drilling debris from the drill bit. In the one full turn forward and one quarter turn reverse operation, the drilling debris are cleared from the drill bit during the drilling operation.

A tapping mode may be provided by the controller 18 to reverse the spin direction based on the handle position of the drill press operating handle or on the depth of the bore formed in the work piece.

The controller 18 may be connected to a temperature sensor 20 to sense a temperature of the power tool 10 and/or the working element 14. The temperature sensor 20 may be a thermocouple. A drill bit or other working element that has become dull will heat up, which is sensed by the controller 18 and used to control the operation of the tool. The controller 18 indicates that the working element 14 has been in use too long or that there is a maintenance issue that needs to be addressed.

The sensor 20 may include an accelerometer to sense a position of the tool 10. For example, if the tool is tipped over, the motor is automatically shut off by the control circuit. Other changes in position or orientation of all or part of the tool 10 may be sensed to shut off the tool, or otherwise change an operating condition.

In certain embodiments, the controller 18 samples the torque of the motor many times per second. In one example, the controller 18 senses the torque 400 times per second. Increase and decreases in torque are sensed as determined by the controller 18.

The controller may be programmed to operate in different modes, such as described herein. The programmed controller may include a computer readable media, such as a memory chip or other memory, in which is stored program code and/or values used in the operation of the controller. The controller may include interface circuits, associated circuit elements, and other elements to provide the functions described herein.

A pilot hole operating mode of the controller may provide that a lower speed at a given torque is sensed to determine that the working element is biting into the work piece 16. The controller automatically controls the power tool to apply additional torque.

In certain embodiments, the tool 10 is a band saw. The controller 18 may sense a break in the band saw blade and automatically stop the tool. The controller may be connected to a temperature sensor of a component of the saw to control the saw based on the sensed temperature.

Other embodiments provide that the tool is a hoist. The controller 18 of the hoist may sense lifting of a load. The load weight may be determined and the controller 18 may refuse to lift a load that is beyond the lift capacity of the hoist. The controller 18 may control the hoist to slow down as the load is nearing a landing site. The controller 18 may control the hoist motor to provide a soft start (slow lift start) or to provide a quick start. The sensor 20 may sense a temperature of bearings, for example, bearings of the hoist. The bearing life may be thereby be determined by the controller 18. The controller 18 may sense a change in torque indicative of the load tipping, and may automatically control the hoist to address the tipping. In a hoist, a remote control may be provided with a display on which the operating condition may be read out. By providing the motor directly driving the working element of the hoist, a large and expensive transmission may be eliminated. The direct drive of the motor 12 may also eliminate the inverter commonly used on hoists.

The tool 10 may be a lathe. The controller 18 may sense an unbalanced load on the lathe and shut off the lathe motor 12. The controller 18 may be provided for speed control of the lathe.

The tool 10 may be a drum sander. The controller 18 may sense that the work piece has shot through the drum sander tool, which may cause the controller 18 to automatically shut of the tool 10. In other words, instead of being abraded by the sanding drum, the work piece may be grabbed by the sanding drum and moved abruptly as a result of the grabbing. The controller may sense an off balance or out of balance condition of the drum and/or provide a leveling screen. An indicator may be provided to emit a signal when the tool is leveled.

The tool 10 may be a dust collector. The torque sensed by the controller 18 may sense that the filter is blocked or dirty. The controller may include a display to show the user the filter life left for the filter. A benchmark value for the sensed reluctance may be established for a clean filter. Increases in the torque required for the suction motor may be used by the controller 18 to indicate the increasingly dirty filter.

The tool 10 may be a grinder. The controller may determine an off balance condition for the grinder. This may be the result of a crack in the grinding wheel. A growing crack may be sensed by the controller, and the tool controlled based on the sensed information. A sensor 20 may be provided on the guard for the grinder. The sensor 20 may be a contact sensor that is used by the controller to stop the tool 10.

The tool 10 may be a table saw. The controller may sense changes in the resistance of the saw blade and control the operation of the saw.

The controller 18 may be configured to sense a void, such as the working element entering an open area of the work piece. For example, the table saw may be controlled to automatically stop the blade or otherwise change its operation when the saw blade encounters a void in the work piece. The void detection and automatic control may be provided for other tools as well.

The controller 18 may be used as an anti-kickback control for the tool. If the controller senses that the working element catches on the work piece and kicks it back, the controller may automatically halt operation of the tool.

The controller 18 may sense that the work piece has split and halt or otherwise change the operation of the tool. For example, a split wood detection is provided. The quality of the cut by the tool is improved so that the cut is smoother.

The sensor 20 may be an optical sensor. The sensor 20 may sense the user's hand or other body part. The tool 10 may be stopped by the controller 18 when the user's hand is too near to the working element 14. The optical sensor 20 may provide speed control of the tool 10 by a wave of the user's hand.

Any input may be translated into any action according to the present invention.

The present invention may encompass a method of operation of the tool using the controller. The tool 10 is operated by sensing the current, or reluctance, by the motor coils. The variations in the current indicate different loads on the motor 12. The variations in load are detected by the controller and reacts to the change in load.

In an example of a woodworking tool 10, the working element 14 hits a knot in the wood, causing a detectable load change. The tool 10 may be sped up, slowed down, or stopped. Hitting a void in the work piece may also be detected.

The detection of a change in load by the controller 18 may cause a warning light and/or sound and/or vibration or other detectable indication to be generated.

The controller 18 may be programmed to provide one or more of the functions described herein. The controller 18 program may be selected by the user or may be set at the factory. The controller 18 may be reprogrammed or updated by updates. The updates may be provided by wired connection or wireless communication.

Figure 2:
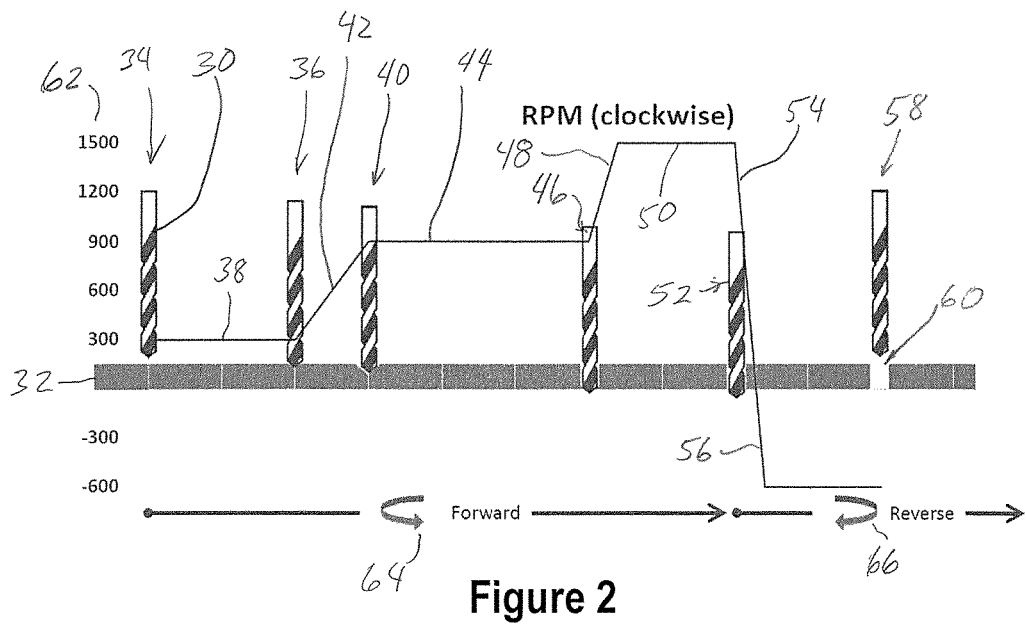
FIG. 2 is a diagram showing a correlation between speed of a power drill and resistance or load encountered on the bit of the power drill.

Turning to FIG. 2, a power tool such as a drill press, hand drill or other drill is driven by a variable reluctance motor that includes a controller which senses load on the tool. In the illustrated example, the power tool is a drill press in which is mounted a drill bit 30. The drill bit 30 is being used to drill a hole in a workpiece such as a board 32. As shown in the first position 34, the drill bit 30 has not yet reached the board 32 and is driven at a speed of 300 RPM (Revolutions Per Minute). When the drill bit 30 contacts the board 32, as shown at position 36, and begins to be subjected to resistance as the drill bit bites into the material of the board 32, the feedback from the controller senses the resistance and automatically controls the speed of the motor to increase the drill bit speed. Prior to contact the motor speed is maintained at a constant speed as shown by line 38. From initial contact at position 36 to full engagement across the diameter of the drill bit at position 40, the motor speed is increased from 300 RPM to 900 RPM as indicated by inclined line 42. The resistance sensed by the controller remains constant as the drill is drilling through the depth of the board 32 and the motor speed is maintained at a constant level during the portion of the drilling operation through the depth of the board 32, as shown at line 44.

As shown at position 46, the tip of the drill bit 30 has broken through the opposite side of the board 32. The resistance or load on the drill bit 30 decreases. This decreased resistance is sensed by the controller, which triggers an increase in motor speed from 900 RPM to 1500 RPM, as shown by inclined line 48. The high speed is maintained as the drill bit passes through the other side of the board as shown by horizontal line portion 50. The high speed exit helps to prevent splintering of the board at the hole.

Once the drill bit 30 breaks entirely through the board 32 as shown at position 52, the resistance on the drill bit drops suddenly. The motor rapidly decreases the drill bit speed as shown by declined line 54. The drill bit speed is decreased to zero and then is operated in a reverse direction as shown by the declined line portion 56. In the example, the drill bit 30 is operated at a speed of 600 RPM in the reverse direction. The reverse direction operation is maintained while the drill bit 30 is removed from the board 32, as shown in position 58. The reverse operation of the drill bit 30 facilitates easy removal of the bit from the board 32. The drilling operation leaves a hole 60 in the board 32.

The drill bit speeds are marked on the scale 62 in the drawing on the vertical axis, and the rotational direction is marked as either forward or reverse at 64 and 66.

Figure 3:
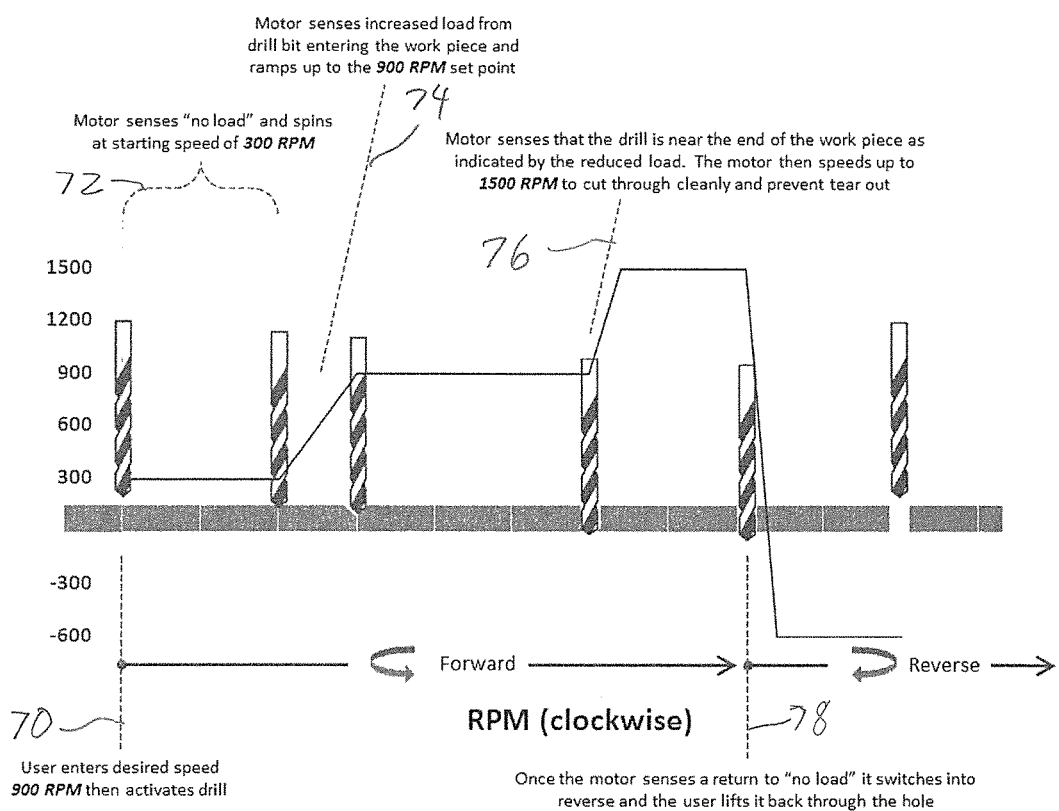
FIG. 3 is a diagram similar to FIG. 2 including additional information on motor operation.

FIG. 3 shows the programming that contributes to the drilling operation of FIG. 2. At 70, the user enters into the drill press a desired operating speed for the drilling of the board 32. In the illustrated embodiment, the user enters 900 RPM as the desired speed. The user may enter that value numerically or by selecting a setting on a dial, wheel, knob, switch or other control. The power tool may be provided with present speed values that are not user selectable in certain embodiments. As indicated at 72, the controller senses no load on the drill bit and so spins at a starting speed of 300 RPM. As indicated at 74, the controller senses the increased load from the drill bit entering the workpiece and ramps up the speed to the 900 RPM speed set by the user or otherwise determined.

At 76, the controller senses that the drill is near the end of the work piece as indicated by the reduced load. As a result, the motor speeds up to 1500 RPM to cut through cleanly and prevent tear out. At 78, the controller senses a no-load condition which causes it to switch into reverse and the user may lift the drill bit back through the hole.

The drill may be programmed for the illustrated profile or for other profiles as desired.

Figure 4:
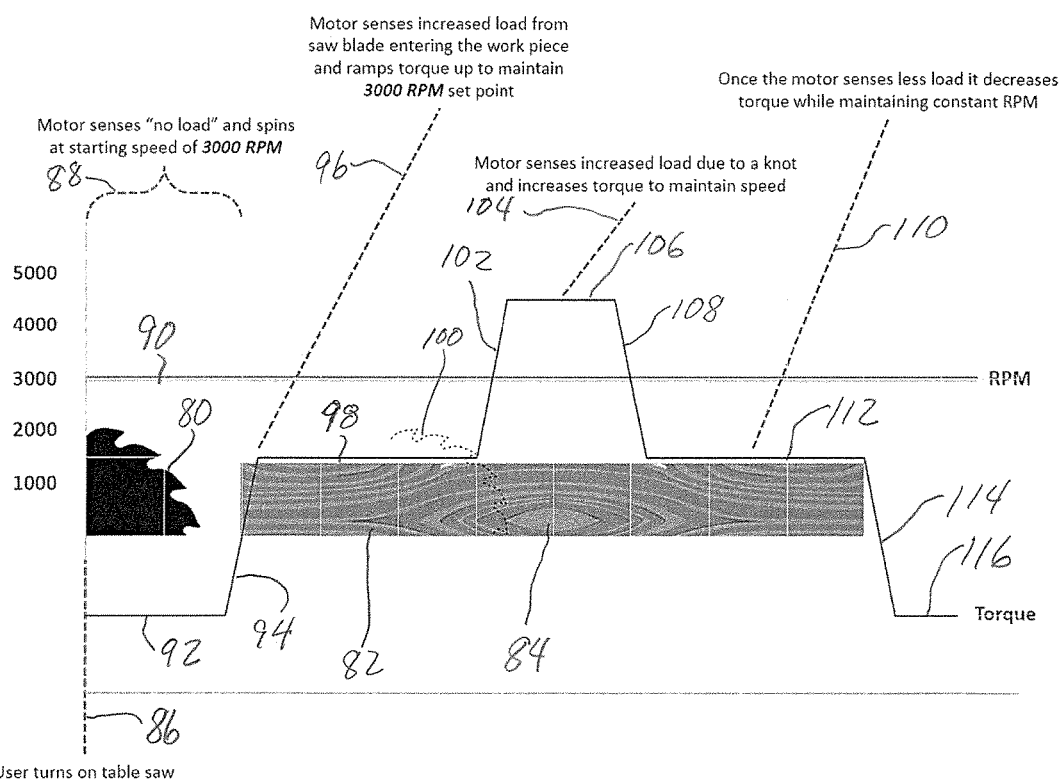
FIG. 4 is a diagram showing a correlation between torque output by a table saw and resistance or load encountered by the blade of the table saw.

With reference to FIG. 4, a table saw or other circular saw has a saw blade 80 that is being used to cut through a board 82. The board 82 has a knot 84 which is provides a greater resistance to cutting. Other features of the board, such as grain direction or grain density, moisture, sap, or other characteristics, may cause variations in cutting resistance as well. At 86, the user turns on the table saw. As indicated at 88, the controller senses a no-load condition and starts the saw blade spinning at 3000 RPM. The 3000 RPM speed is shown as a line 90. The resistance or load sensed by changes in reluctance of the motor is shown by the line 92.

When the blade 80 contacts the board 82, the resistance increases as indicated by inclined line 94. The controller senses the increased load on the saw blade 80 as the blade begins to cut into the board. The motor increases the torque on the blade to maintain the speed of the saw blade 80 at 3000 RPM, as indicated at 96. The saw blade 80 continues to cut the board, forming a blade cut in the board, and the resistance or load on the blade is generally constant, as shown at line 98. When the saw blade 80 reaches the position as shown in broken lines at 100, the blade begins to cut into the knot 84. The load or resistance increases as shown by inclined line 102. As indicated at 104, the controller senses the increased load of cutting through the knot and increases the torque to maintain the blade speed of 3000 RPM. The torque is maintained at a constant level while cutting through the knot 84, as shown by line 106. After the saw blade 80 finishes cutting through the knot 84, or other tough or dense area of the board 82, the controller senses the decrease in load as shown by the declined line 108. The motor reduces the torque on the blade as indicated at 110 to maintain the speed of 3000 RPM. The load is generally constant as shown by the line portion 112 until the blade 80 reaches the end of the board 82. The load on the blade 80 drops off as shown at declined line 114. The no load condition is indicated by the line portion 116. The changes in load condition are sensed to maintain the blade speed at the generally constant speed of 3000 RPM as shown by the line 90.

The motor may be programmed for the illustrated profile or for other profiles as desired.

Figure 5:
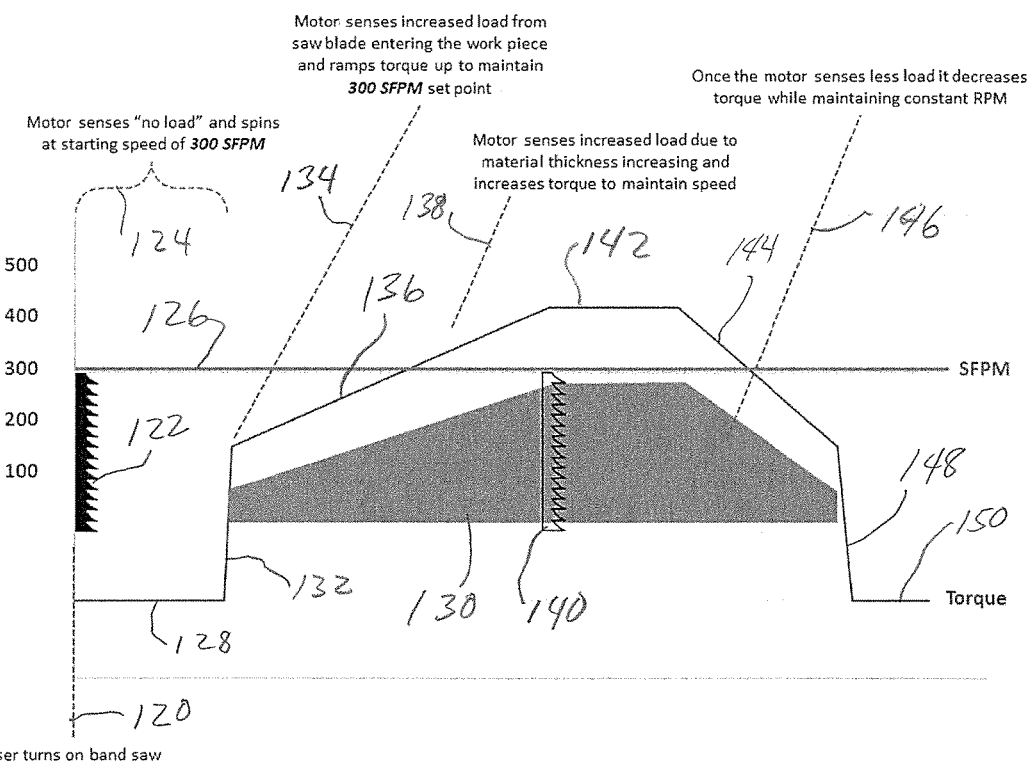
FIG. 5 is a diagram showing a correlation between torque output by a band saw and resistance or load encountered by the blade of the band saw.

Turning to FIG. 5, a band saw is provided with a digital variable reluctance motor and is programmed with a profile specific to band saws. At 120, the user turns on the band saw. The band saw blade 122 comes up to speed until it reaches the desired speed of 300 SFPM (Saw Feet Per Minute). The controller senses a no-load condition as indicated at 124 and maintains the speed of the blade at 300 SFPM, as shown at line 126. The no-load condition is indicated by line 128. The user moves a workpiece 130 toward the cutting edge of the blade 122 until it contacts the blade. The load increases at inclined line 132 which is sensed by the changes in the reluctance of the motor as indicated at 134. The motor is controlled to increase the torque on the blade as a result of sensing the increased load to maintain the speed of 300 SFPM.

In this example, the workpiece has an increasing thickness in the direction of cut, which places an increasing load on the blade 122 as shown by inclined line 136. As indicated at 138, the controller senses the increased load of the increasing material thickness and increases the torque applied to the blade 122 to maintain the speed.

At blade position 140, the saw blade 122 reaches an area of constant thickness of the workpiece 130. The load is constant while cutting this portion as indicated by the line portion 142, so the torque is maintained at a constant level. Following the constant thickness portion in the direction of cut, the workpiece decreases in thickness. The decrease in workpiece thickness results in a decrease in the load on the blade 122 as indicated by the declined line 144. As indicated at 146, the motor reluctance change of the decreased load is sensed and the control decreases the torque on the blade 122 so as to maintain a generally constant blade speed as shown by the line 126. When the blade completes the cut at the back end of the workpiece, the load decreases as shown at 148 to the no load value at 150. The load profile mirrors the shape profile of the workpiece in this example. Where more dense or less dense areas or voids are in the workpiece, the load profile may vary from the workpiece profile.

In the drill examples, the speed of the tool is varied depending on sensed load to accomplish certain results. In the saw examples, the speed is generally constant but the torque on the tool is varied depending on sensed load. Either speed or torque or both may be varied depending on sensed load on any of drills, saws, sanders, planers, or other tools.

Figure 6:
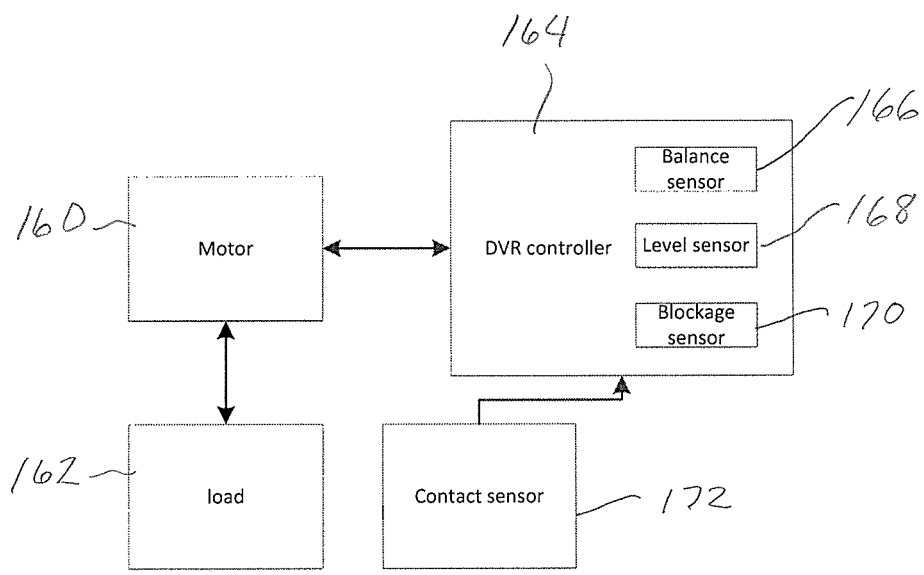
FIG. 6 is a block diagram of a motor control for detecting balance, level and blockage conditions.

Referring to FIG. 6, a controller is provided that is used to sense predetermined conditions of the tool or other device. A motor 160 is connected to a load 162. The load may be any load of the tool or other device. In certain examples, the load may be one or more grinding wheels, saw blades, fans, blowers, chucks or other load. The motor 160 operates to drive the load 162. A digital variable reluctance controller 164 is connected to the motor 160 to sense operating characteristics of the motor 160. The controller 164 is constructed and programmed to detect the predetermined condition of the tool. In a certain example, the controller 164 includes a balance sensor 166. The balance sensor 166 may sense an out of balance condition of the load 162 such as an out of balance grinding wheel, a chipped or cracked grinding wheel, an out of balance condition of a workpiece held in a chuck of a lathe or other tool, an out of balance condition of a working element of the tool, or other out of balance condition. The controller 164 may control the operation of the motor 160 including halting operation of the motor 160 upon detection of an out of balance condition, and/or displaying an alert of the out of balance condition on a display, alarm, or indicator, or take other action.

The controller 164 may be programmed to include a level sensor 168 to detect an out of level condition of the tool using feedback from the motor 160. The controller 164 may halt or otherwise control the operation of the motor 160 based on sensing a balance or out of balance condition, and/or displaying an alert of the out of level condition on a display, alarm, or indicator, or take other action.

The controller 164 may be programmed to include a blockage sensor 170 by which a blockage of a filter media may be sensed. For example, the tool may be a dust collector and the motor 160 drives the fan or blower as the load 162. As the filter media of the dust collector becomes blocked during use of the dust collector, the controller 164 is programmed to detect the blockage as shown at 170. The controller 164 may halt or otherwise control the operation of the motor 160 and/or display an alert of the blockage condition on a display, alarm, or indicator, or take other action.

The tool may be provided with a contact sensor 172 that senses contact, for example by the user. The contact sensor 172 may be positioned near a working element of the tool such as near a saw blade, grinder wheel, drill bit, router bit, sanding drum, sanding belt or other working element. Upon sensing contact by the user at the contact sensor 172, the motor 160 may be controlled, such as by halting the motor 160. A user who's hand gets too close to the moving saw blade, for example, contacts the sensor 172, halting the motor 160 and thus stopping the saw blade.

The controller 164 may have only one of the sensors shown or may have any combination of the sensors, including having all of the illustrated sensors. Other sensors are possible within the scope of the present invention.

In a first aspect, a method for operating a power tool, comprising: operating a motor of the power tool; driving a working element of the power tool using the motor, the working element engaging a work piece during the driving of the working element; sensing reluctance of the motor during the driving of the working element; sensing a predetermined change in the reluctance of the motor during driving of the working element, the predetermined change in the reluctance corresponding to a change in a resistance to the driving of the working element wherein the change in the resistance to driving is a result of interaction between the working element and the work piece; and automatically performing a predetermined action upon sensing the predetermined change, the predetermined action being an action selected from the group consisting of: stopping operation of the motor, reversing operation of the motor, increasing the speed of the motor, decreasing the speed of the motor, increasing the torque output by the motor, and decreasing the torque by the motor.

In a second aspect, a method of the first aspect, wherein the predetermined action includes operating the motor according to a predetermined operating profile.

In a third aspect, a method of the second aspect, wherein the predetermined operating profile includes: increasing the motor speed according to the operating profile upon sensing a first predetermined change in the motor reluctance, and decreasing the motor speed according to the operating profile upon sensing a second predetermined change in the motor reluctance.

In a fourth aspect, a method of the third aspect, wherein the predetermined operating profile includes: reversing the motor operation upon sensing a third predetermined change in the motor reluctance.

In a fifth aspect, a method of the third aspect, wherein the predetermined operating profile includes halting motor operation upon sensing a fourth predetermined change in the motor reluctance.

In a sixth aspect, a method of the first aspect, further comprising: detecting an emergency condition by sensing a predetermined emergency change in the motor reluctance; and automatically performing an emergency operation of the motor upon detection of the emergency condition. In certain aspects, the emergency condition sensed by a change in the motor reluctance includes at least one of sensing an unbalanced condition of the working element, sensing a fracture of the working element, or sensing a chip in the working element.

In a seventh aspect, a method of the sixth aspect, wherein the detecting of the emergency condition includes detecting release of the workpiece from an engaged condition.

In an eighth aspect, a method of the first aspect, wherein the power tool is a saw, and wherein the predetermined action includes one of increasing the torque or decreasing the torque output by the motor while maintaining a speed of the motor.

In a ninth aspect, a method of the first aspect, wherein the power tool is a drill, and wherein the predetermined action includes one of increasing the speed or decreasing the speed of the motor.

In a tenth aspect, a method of the first aspect, wherein the power tool is a lifting tool, and wherein the predetermined action includes inhibiting lifting by the power tool upon sensing a load beyond a lifting capacity of the lifting tool.

In an eleventh aspect, a method of the first aspect, wherein the power tool is a lifting tool, and wherein the predetermined action includes at least one of a slow lift start of the load or a slow landing of the load.

In a twelfth aspect, a method of the first aspect, wherein the sensing the predetermined change includes a first sensing of an increase in load on the working element upon an initial contact of the working element with the work piece and a second sensing of a decrease in load on the working element upon the working element reaching an end of the work piece.

In a thirteenth aspect, a method of the first aspect, wherein the sensing the predetermined change includes sensing a decrease in load on the working element upon the working element reaching a void in the work piece.

In a fourteenth aspect, a method of the first aspect, wherein the automatically performed predetermined action includes reading a programmed action from a memory.

In a fifteenth aspect, a method of the first aspect, further comprising: sensing a further condition; and automatically controlling the motor upon sensing a predetermined state of the further condition. In a further aspect, the further condition may include a condition selected from the group consisting of: a temperature of the working element, a temperature of bearings, a position of the power tool, an acceleration of the power tool, or a position of a user or user's body part.

In a sixteenth aspect, a method of the first aspect, further comprising: emitting an indication upon performing the predetermined action, wherein the indication includes at least one of light, sound or vibration.

In a seventeenth aspect, a method of the first aspect, wherein the sensing the change in the reluctance include sensing the change in reluctance as a result of at least one of: a change in thickness of the workpiece, a change in density of the workpiece, a knot in the work piece, a void in the work piece.

In an eighteenth aspect, a power tool, comprising: a motor connected for selective operation; a working element connected to an output the motor for driving the working element; a control connected to the motor for sensing changes in reluctance by the motor as a result of changes in load on the working element, the control being operable to automatically perform an action upon sensing a predetermined change in the reluctance, the action including at least one of: stopping operation of the motor, reversing operation of the motor, increasing a speed of the motor, decreasing the speed of the motor, increasing an output torque by the motor, and decreasing the output torque by the motor.

In a nineteenth aspect, a power tool of the eighteenth aspect, further comprising: a memory and a processor in the power tool, the memory storing a motor operating profile and the processor being operable to execute the motor operating profile upon sending predetermined changes in the reluctance.

In a twentieth aspect, a power tool of the eighteenth aspect, wherein the control is operable to operate the motor in alternating forward and reverse operation.

In a twenty-first aspect, a method for operating a drill, comprising: operating a motor of the drill; driving a bit of the drill using the motor, the bit engaging a work piece during the driving of the bit; sensing a reluctance of the motor during the driving of the bit; sensing a predetermined change in the reluctance of the motor during the driving of the bit, the predetermined change in the reluctance corresponding to a change in a load on the bit by interaction between the bit and the work piece; and automatically performing a predetermined action upon sensing the predetermine change, the predetermined action including increasing or decreasing a speed of the motor or reversing the motor upon sensing the predetermined condition.

In a twenty-second aspect, a method of the twenty-first aspect, further comprising: automatically increasing a speed of the motor upon sensing the bit reaching an exit surface of the work piece by a change in the reluctance.

In a twenty-third aspect, a method of the twenty-first aspect, further comprising: automatically increasing a speed of the motor upon sending initial contact of the bit with a surface of the work piece by a change in the reluctance.

In a twenty-fourth aspect, a method of operating a saw, comprising: operating a motor of the saw; driving a blade of the saw using the motor, the blade engaging a work piece during the driving of the blade; sensing a reluctance of the motor during the driving of the blade; sensing a predetermined change in the reluctance of the motor during the driving of the blade, the predetermined change in the reluctance corresponding to a change in a load on the blade by interaction between the blade and the work piece; and automatically performing a predetermined action upon sensing the predetermine change, the predetermined action including increasing or decreasing a torque on the blade to maintain a predetermined speed of the motor upon sensing the predetermined condition.

In a twenty-fifth aspect, a method of the twenty-fourth aspect, further comprising: automatically increasing the torque on the blade upon sensing an initial contact between the blade and the work piece by the change in the reluctance.

In a twenty-sixth aspect, a method of the twenty-fourth aspect, wherein the saw is a band saw, and further comprising: sensing breakage of the blade by a change in the reluctance; and stopping the motor upon the breakage being sensed.

In a twenty-seventh aspect, a method of the twenty-third aspect, wherein the sensing the predetermined change in the reluctance corresponds to a change in one of a thickness or density of the work piece.

Thus, there is provided a control for the motor of the power tool that senses an operating characteristic of the motor and controls the operation of the power tool based on the sensed characteristic. The sensed characteristic includes variations in reluctance of the motor. A controller may sense changes on load on the motor as a result of interaction between a working element such as a saw blade or drill bit and the work piece. The controlled operation may include variation in speed or torque or both, or may include stopping the motor. Emergency conditions may be sensed by changes in reluctance.

Although other modifications and changes may be suggested by those skilled in the art, it is the intention of the inventors to embody within the patent warranted hereon all changes and modifications as reasonably and properly come within the scope of their contribution to the art.

I claim:

1. A method for operating a power tool, comprising:
   operating a motor of the power tool;
   driving a working element of the power tool using the motor, the working element engaging a work piece during the driving of the working element;
   sensing reluctance of the motor during the driving of the working element;
   sensing a predetermined change in the reluctance of the motor during driving of the working element, the predetermined change in the reluctance corresponding to a change in a resistance to the driving of the working element wherein the change in the resistance to driving is a result of interaction between the working element and the work piece; and
   automatically performing a predetermined action upon sensing the predetermined change, the predetermined action being an action selected from the group consisting of: stopping operation of the motor, reversing operation of the motor, increasing the speed of the motor, decreasing the speed of the motor, increasing the torque output by the motor, and decreasing the torque by the motor wherein the predetermined action includes operating the motor according to a predetermined operating profile, the operating profile including increasing the motor speed upon sensing a first predetermined change in the motor reluctance, and decreasing the motor speed according to the operating profile upon sensing a second predetermined change in the motor reluctance.

2. A method as claimed in claim 1, wherein the predetermined operating profile includes:
   reversing the motor operation upon sensing a third predetermined change in the motor reluctance.

3. A method as claimed in claim 1, wherein the predetermined operating profile includes halting motor operation upon sensing a fourth predetermined change in the motor reluctance.

4. A method as claimed in claim 1, further comprising:
   detecting an emergency condition by sensing a predetermined emergency change in the motor reluctance; and
   automatically performing an emergency operation of the motor upon detection of the emergency condition.

5. A method as claimed in claim 4, wherein the detecting of the emergency condition includes detecting release of the workpiece from an engaged condition.

6. A method as claimed in claim 4, wherein the emergency condition sensed by a change in the motor reluctance includes at least one of sensing an unbalanced condition of the working element, sensing a fracture of the working element, or sensing a chip in the working element.

7. A method as claimed in claim 1, wherein the power tool is a saw, and wherein the predetermined action includes one of increasing the torque or decreasing the torque output by the motor while maintaining a speed of the motor.

8. A method as claimed in claim 1, wherein the power tool is a drill, and wherein the predetermined action includes one of increasing the speed or decreasing the speed of the motor.

9. A method as claimed in claim 1, wherein the power tool is a lifting tool, and wherein the predetermined action includes inhibiting lifting by the power tool upon sensing a load beyond a lifting capacity of the lifting tool.

10. A method as claimed in claim 1, wherein the power tool is a lifting tool, and wherein the predetermined action includes at least one of a slow lift start of the load or a slow landing of the load.

11. A method as claimed in claim 1, wherein the sensing the predetermined change includes a first sensing of an increase in load on the working element upon an initial contact of the working element with the work piece and a second sensing of a decrease in load on the working element upon the working element reaching an end of the work piece.

12. A method as claimed in claim 1, wherein the sensing the predetermined change includes sensing a decrease in load on the working element upon the working element reaching a void in the work piece.

13. A method as claimed in claim 1, wherein the automatically performed predetermined action includes reading a programmed action from a memory.

14. A method as claimed in claim 1, further comprising:
   sensing a further condition; and
   automatically controlling the motor upon sensing a predetermined state of the further condition.

15. A method as claimed in claim 14, wherein the further condition includes a condition selected from the group consisting of: a temperature of the working element, a temperature of bearings, a position of the power tool, an acceleration of the power tool, or a position of a user or user's body part.

16. A method as claimed in claim 1, further comprising:
   emitting an indication upon performing the predetermined action, wherein the indication includes at least one of light, sound or vibration.

17. A method as claimed in claim 1, wherein the sensing the change in the reluctance include sensing the change in reluctance as a result of at least one of: a change in thickness of the workpiece, a change in density of the workpiece, a knot in the work piece, a void in the work piece.

18. A power tool, comprising:
   a motor;
   a working element connected to the motor, the motor selectively driving the working element;
   a control connected to the motor for sensing changes in reluctance by the motor as a result of changes in load on the working element, the control including a memory operable to store a motor operating profile and a processor operable to execute the motor operating profile upon the control sensing predetermined changes in the reluctance such that the control is operable to automatically perform an action upon sensing one of the predetermined changes in the reluctance, the action including at least one of: stopping operation of the motor, reversing operation of the motor, increasing a speed of the motor, decreasing the speed of the motor, increasing an output torque by the motor, and decreasing the output torque by the motor.

19. A power tool as claimed in claim 18, wherein the control is operable to operate the motor in alternating forward and reverse operation.

20. A method for operating a drill, comprising:
operating a motor of the drill;
driving a bit of the drill using the motor, the bit engaging a work piece during the driving of the bit;
sensing a reluctance of the motor during the driving of the bit;
sensing a predetermined change in the reluctance of the motor during the driving of the bit, the predetermined change in the reluctance corresponding to a change in a load on the bit by interaction between the bit and the work piece; and
automatically performing a predetermined action upon sensing the predetermined change, the predetermined action including automatically increasing a speed of the motor upon initial contact of the bit with a surface of the work piece, the initial contact represented by the predetermined change in the reluctance of the motor.

21. A method as claimed in claim 20, further comprising:
automatically increasing a speed of the motor upon sensing the bit reaching an exit surface of the work piece by a change in the reluctance, the reaching of the exit surface represented by a subsequent change in the reluctance of the motor.

22. A method of operating a saw, comprising:
operating a motor of the saw;
driving a blade of the saw using the motor, the blade engaging a work piece during the driving of the blade;
sensing a reluctance of the motor during the driving of the blade;
sensing a predetermined change in the reluctance of the motor during the driving of the blade, the predetermined change in the reluctance corresponding to a change in a load on the blade by interaction between the blade and the work piece; and
automatically performing a predetermined action upon sensing the predetermine change, the predetermined action including increasing or decreasing a torque on the blade to maintain a predetermined speed of the motor upon sensing the predetermined condition.

23. A method as claimed in claim 22, further comprising:
automatically increasing the torque on the blade upon sensing an initial contact between the blade and the work piece by the change in the reluctance.

24. A method as claimed in claim 22, wherein the saw is a band saw, and further comprising:
sensing breakage of the blade by a change in the reluctance; and
stopping the motor upon the breakage being sensed.

25. A method as claimed in claim 22, wherein the sensing the predetermined change in the reluctance corresponds to a change in one of a thickness or density of the work piece.

* * * * *